United States Patent
Nakano

Patent Number: 6,032,046
Date of Patent: Feb. 29, 2000

[54] BASE STATION FREQUENCY ASSIGNING SYSTEM FOR A MOBILE COMMUNICATIONS SYSTEM

[75] Inventor: Shuichi Nakano, Tokyo, Japan

[73] Assignee: NEC Corporation, Tokyo, Japan

[21] Appl. No.: 08/884,167

[22] Filed: Jun. 27, 1997

[30] Foreign Application Priority Data

Jun. 27, 1996 [JP] Japan .................................. 8-166965

[51] Int. Cl.[7] .................................................. H04Q 7/26
[52] U.S. Cl. .............................. 455/450; 455/62; 455/63; 455/67.1; 455/509; 370/329; 370/341
[58] Field of Search ................................ 455/422, 446, 455/447, 449, 450, 451, 452, 509, 513, 514, 62, 63, 67.1, 437, FOR 100, FOR 104; 370/329, 332, 333, 341

[56] References Cited

U.S. PATENT DOCUMENTS

| | | | |
|---|---|---|---|
| 5,432,843 | 7/1995 | Bonta | 455/437 |
| 5,452,471 | 9/1995 | Leopold et al. | 455/12.1 |
| 5,752,192 | 5/1998 | Hamabe | 455/450 |
| 5,854,981 | 12/1998 | Wallstedt et al. | 455/446 |

FOREIGN PATENT DOCUMENTS

| | | |
|---|---|---|
| 1-253326 | 10/1989 | Japan . |
| 4-48829 | 2/1992 | Japan . |
| 4-91522 | 3/1992 | Japan . |
| 6-237209 | 8/1994 | Japan . |
| 8-163630 | 6/1996 | Japan . |

OTHER PUBLICATIONS

Operations Generic Criteria for PACS NEs FWA Radio Port (RP), Issue 2, Mar. 1995, 5–14–5–16 and 6–6.

*Primary Examiner*—Lee Nguyen
*Attorney, Agent, or Firm*—Foley & Lardner

[57] ABSTRACT

A base station frequency assigning system for a mobile communication system which is capable of assigning operational frequency for each base station in a short time is realized. Base stations 11(1) to 11(N) are grouped into small groups, which are grouped into large groups. A base station control station 13 notifies each small group of the respectively predetermined frequencies and each base station 11 in the respective groups measures the field intensity of each frequency by means of a frequency measuring unit 23. A frequency determining unit 24 determines the optical frequency and notifies the base station control station 13 of this frequency. A frequency assignment prohibiting information instructing unit 25 may limit in advance a frequency assignment of the base stations 11 which cannot obtain an adequate result of measurement. A frequency assignment can be quickly performed by grouping the base stations 11.

4 Claims, 9 Drawing Sheets

| SMALL GROUP | FREQUENCY |
|---|---|
| A , F | f1~f10 |
| B , G | f11~f20 |
| C , H | f21~f30 |
| D , I | f31~f40 |

| FREQUENCY | f1 | f2 | f3 | f4 | f5 | f6 | f7 | f8 | f9 | f10 |
|---|---|---|---|---|---|---|---|---|---|---|
| FIELD INTENSITY | 10 | 7 | 14 | 6 | 5 | 3 | 8 | 20 | 30 | 15 |

1ST BASE STATION 111

| FREQUENCY | f1 | f2 | f3 | f4 | f5 |
|---|---|---|---|---|---|
| FIELD INTENSITY | 10 | 7 | 4 | 6 | 5 |

3RD BASE STATION 113

| FREQUENCY | f6 | f7 | f8 | f9 | f10 |
|---|---|---|---|---|---|
| FIELD INTENSITY | 3 | 7 | 14 | 6 | 5 |

Fig.11(A)

1ST BASE STATION 111

| FREQUENCY | f1 | f2 | f3 | f4 | f5 | f6 | f7 | f8 | f9 | f10 |
|---|---|---|---|---|---|---|---|---|---|---|
| FIELD INTENSITY | 10 | 7 | 14 | 6 | 5 | 8 | 3 | 20 | 30 | 15 |

Fig.11(B)

3RD BASE STATION 113

| FREQUENCY | f1 | f2 | f3 | f4 | f5 | f6 | f7 | f8 | f9 | f10 |
|---|---|---|---|---|---|---|---|---|---|---|
| FIELD INTENSITY | 12 | 13 | 6 | 8 | 9 | 15 | 3 | 10 | 15 | 30 | of the Invention

The present invention relates to a base station frequency assigning system for a mobile communication system, and more particularly to a frequency assigning system for each of base stations to automatically assign a frequency to be used for the base station.

2. Description of the Related Art

In a mobile communication system, frequencies or radio channels to be used by a base station are assigned to each base station. A frequency assigned to a base station is also assigned to other base stations which are physically located far away from each other and no interference of frequency occurs between the base stations so as to use a limited frequency effectively.

Even if a frequency to be used for each base station has been assigned in advance in this way, when a new base station is installed additionally due to a service area expansion or new radio channels are additionally introduced due to expansion of traffic capacity later on, it is necessary to change an existing frequency assignment and a frequency assignment should be performed again. One of conventional method of such a frequency assignment is performed by measuring and computing an amount of interference among frequencies used by the base stations and new frequencies to be used are decided. However, it needs a large amount of computational effort.

Thereupon, a Japanese laid-open publication Tokkaihei No. 4-91522 has proposed a frequency assigning system for automatically assigning frequency to be used for each of base stations. In this system at least one station of plural base stations has a means for monitoring frequencies of control channels used by its surrounding base stations. And according to output of this monitoring means, the base station determines a frequency for its own control channel.

In this proposal, a base station detects frequencies used in its surrounding area by the monitoring means, and assigns to itself a frequency being not used in its surrounding area or a frequency, even being used by other base station, which does not cause interference due to weak signal receiving level of the frequency. Therefore, each base station itself can perform a frequency reassignment.

This base station may also be provided with a means for monitoring a frequency of control channel of a mobile station being in its neighboring radio zone whose base station is blocked by a large building or the like. Therefore, even if a frequency radiated by the neighboring base station does not reach to the base station being assigning frequency, the base station does not select the same frequency being used by the neighboring base station.

In the base station frequency assigning system according to this proposal, since a base station determines its operational frequencies one by one, there has seen a problem that it takes a considerably long time to determine operational frequencies of all base stations. And although the proposed technology might not select the same frequency as used in the neighboring base station by monitoring a frequency of control channel of a mobile station being in its neighboring radio zone whose base station is blocked by a large building or the like, it is not perfect to avoid selecting the same frequency because there is no guarantee that all frequencies being used in the neighboring base station can be monitored.

SUMMARY OF THE INVENTION

An object of the invention is to provide a base station frequency assigning system for making it possible for the whole base stations to set their operational frequencies in a short time.

Another object of the invention is to provide a base station frequency assigning system for making it possible for each of the base stations to assign its operational frequency which does not interfere with that of another base station even if frequencies from another case station cannot be measured each other due to geographical condition.

The present invention provides a base station frequency assigning system for a mobile communication system in which a plurality of base stations are connected to a base station control station, the base station control station is connected to both of an exchange and an operation and maintenance center, and base stations locating adjacent each other are grouped into a small group and small groups locating adjacent each other are grouped into a large group. The base station frequency assigning system comprises the following means:

(1) a frequency specifying means, which is provided in the base station control station, for specifying and notifying a group of frequencies as candidates of an operational frequency to each of base stations one by one;

(2) a frequency measuring means, which is provided in each of base stations, for measuring field intensity of each of frequencies being notified; and (3) a frequency determining means, which is provided in each of base stations, for selecting an optimal frequency not interfering with other base stations out of group of frequencies being notified.

The frequency specifying means specifies different group of frequencies to each of small groups belonging to the same large group, and specifies same group of frequencies to small groups belonging to different large groups each other.

The present invention further comprises a frequency assignment prohibiting information instructing means, which is provided in the operation and maintenance center, for storing information of pairs of base stations in a same small group and having possibility of selecting the same operational frequency due to geographical condition, and for instructing this state to the base station control station. In this case, the frequency specifying means in the base station control station divides group of frequencies to be specified to the pair of base stations into two subgroups containing different frequencies each other and notifies different subgroup of frequencies to each of pair of base stations.

In another case, the frequency specifying means in the base station control station only specifies and notifies a group of frequencies as ordinary manner, and when the selected frequency is notified from each base station, it judges whether or not the same frequency has been selected by each of pair of base station instructed from the operation and maintenance center, and specifies again a group of frequencies excluding selected frequency to one of the pair of base stations when the same frequency has been selected by both of the pair of base stations.

BRIEF DESCRIPTION OF THE DRAWINGS

FIG. 9 is an explanatory figure showing relation between frequencies assigned to a base station and their field intensity being detected.

FIG. 11 is an explanatory figure showing relation between frequencies assigned to a base station and their field intensity being detected in this modification example, and FIG. 11(A) is the case for the first base station and FIG. 11(B) is the case for the third base station.

DESCRIPTION OF THE PREFERRED EMBODIMENTS

Embodiments of the present invention are described in detail in the following with reference to the drawings.

Figure 1:
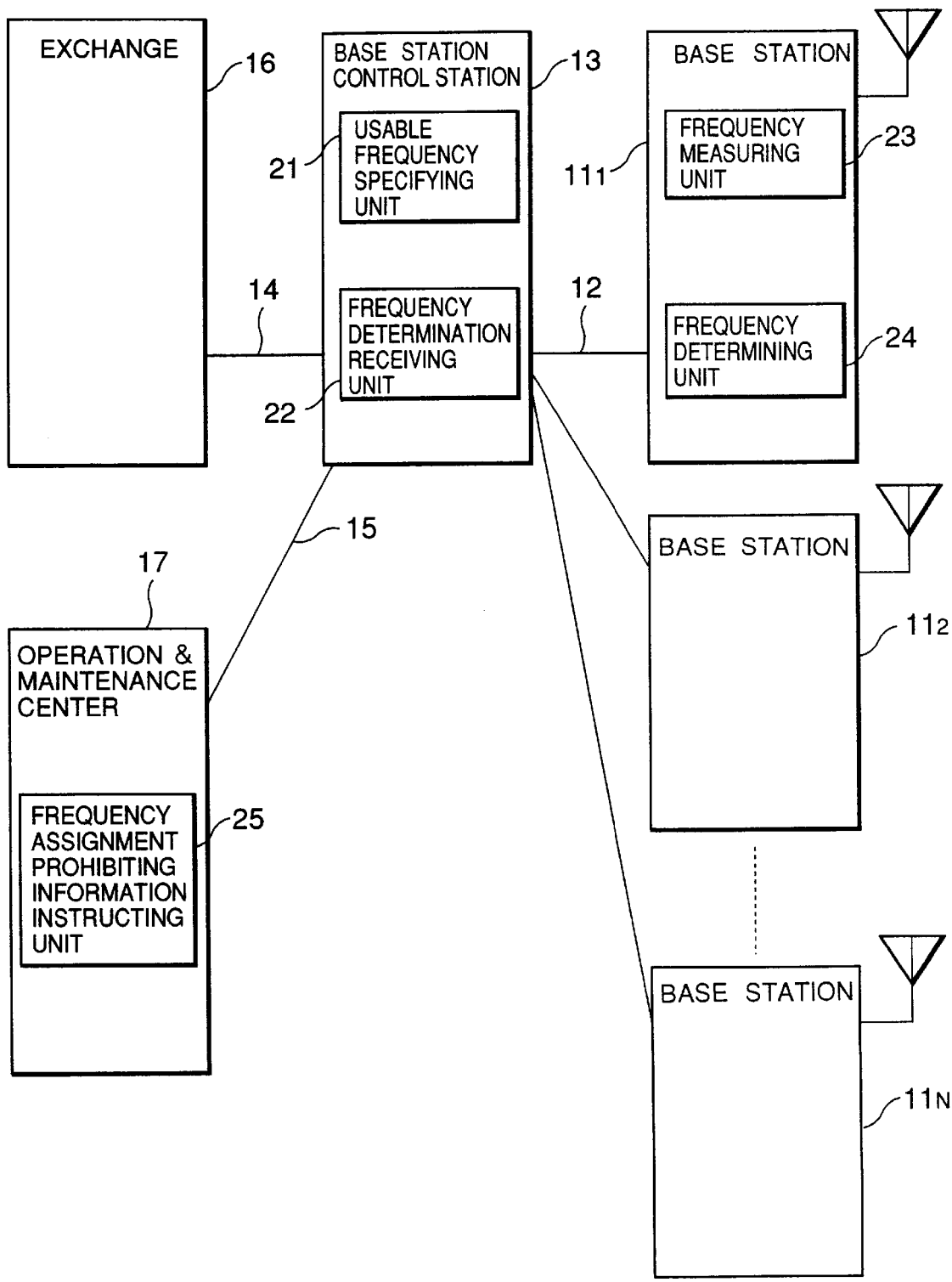
FIG. 1 is a system configuration diagram showing an outline of a base station frequency assigning system according to an embodiment of the present invention.

FIG. 1 is a figure showing an outline of a base station frequency assigning system according to an embodiment of the present invention. Base stations 11(1) to 11(N) are respectively connected to a base station control station 13 through transmission lines 12. The base station control station 13 is connected to an exchange 16 and an operation and maintenance center 17 through transmission lines 14 and 15. The base station control station 13 is provided with a usable frequency specifying unit 21 for specifying frequencies as candidates for assigning for the respective base stations 11(1) to 11(N), and a frequency determination receiving unit 22 for receiving an operational frequency being determined (assigned) by the respective base stations 11(1) to 11(N). That is, specified frequencies are notified to the respective base stations 11(1) to 11(N), each base station measures field intensity of notified frequencies for determining usable frequency in the case station, and the determined frequency is notified to the base station control station. Each of the base stations 11(1) to 11(N) is provided with a frequency measuring unit 23 for measuring field intensity of the specified frequencies radiated from surrounding area and a frequency determining unit 24 for determining a frequency among the specified frequencies which does not interfere with a frequency being used in other base stations. Also the operation and maintenance center 17 is provided with a frequency assignment prohibiting information instructing unit 25. This prohibiting information instructing unit 25 is a device for instructing the information registered in advance by a maintenance personnel to the base station control station 13 so as not to specify the same frequency to the base stations which could be interfering with each other.

Some base stations adjacent to one another out of the base stations 11(1) to 11(N) shown in FIG. 1 are grouped into a small group and some of such small groups positioned near one another are grouped into a large group.

Figure 2:
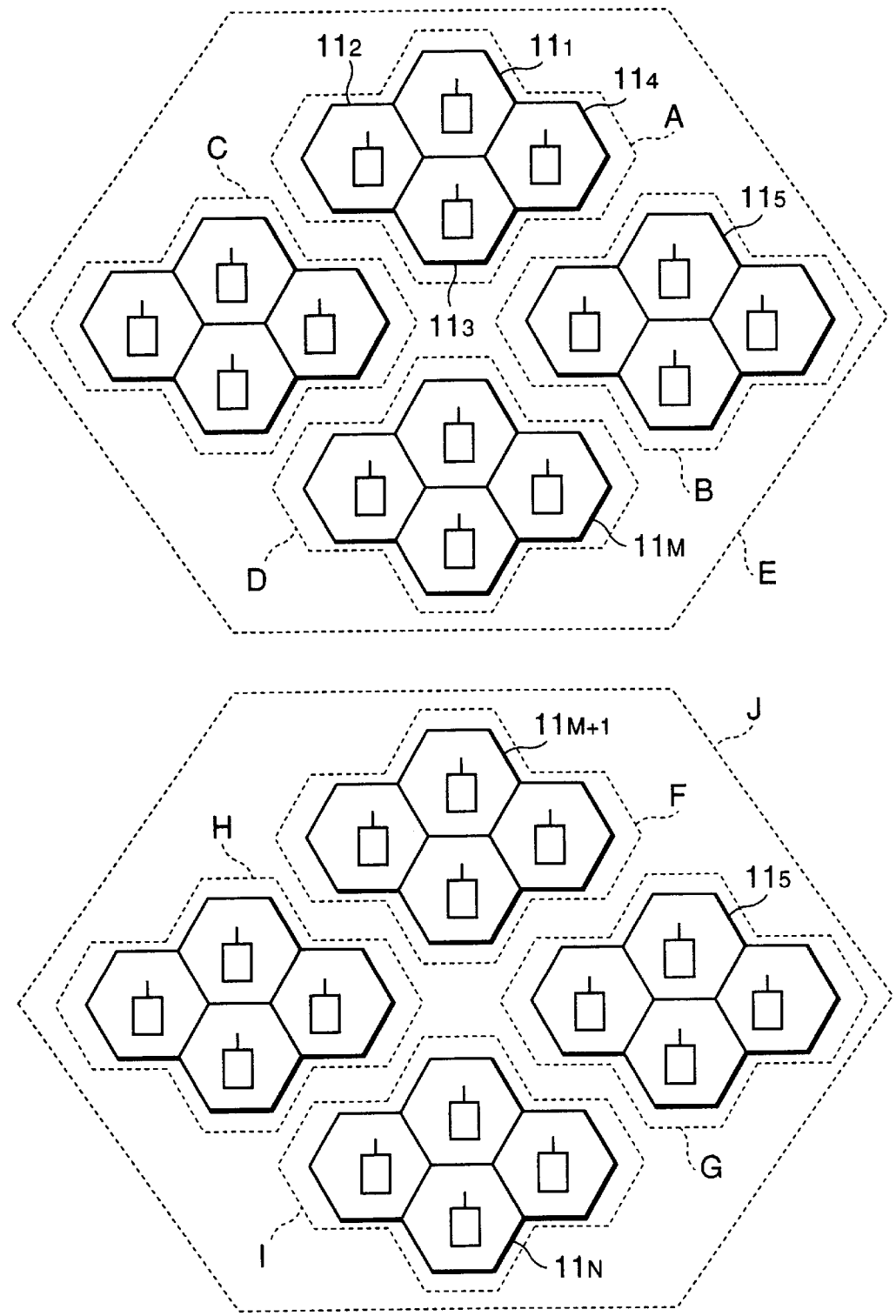
FIG. 2 is an explanatory figure showing a grouping configuration of base stations according to this embodiment.

FIG. 2 is a figure showing a grouping configuration of base stations according to this embodiment. A small group A is composed of a first base station 11(1) to a fourth base station 11(4). Similarly, there are small groups B, C, and D which are composed of several base stations 11(5) to 11(M) adjacent to one another. These small groups A to D are positioned near one another and formed into a large group E. In the same way, other base stations 11(M+1) to 11(N) are grouped into small groups F, G, H, and I by grouping some base stations positioned adjacently to one another, and these small groups, which are positioned adjacently to one another, are grouped into another large group J. The two large groups E and J are positioned so distantly from each other that no problem happens even if they use the same frequency as each other.

In a base station frequency assigning system as composed in such a way, the base station control station 13 shown in FIG. 1 comprises an unillustrated central processing unit (CPU) for performing a control of specifying frequencies to the base stations 11(1) to 11(N) and a storage medium for temporarily storing a control program and data for working. The storage medium may be composed of a read only memory (ROM), a random access memory (RAM), or an RAM and an external storage medium such as a magnetic disk and the like.

Figures 3, 4:
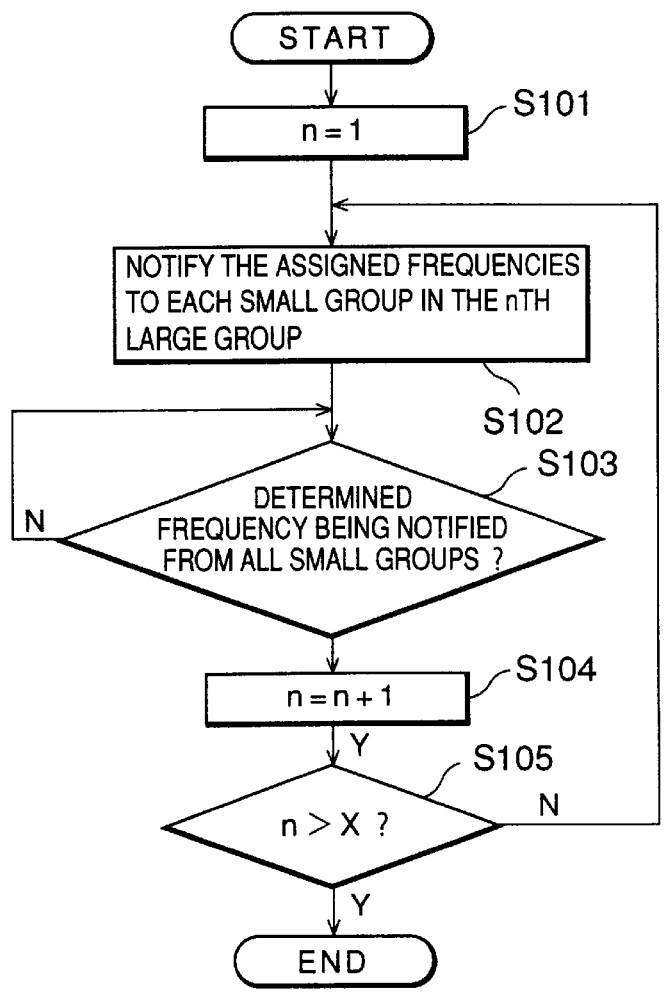
FIG. 3 is an explanatory figure showing a frequency assignment for each of small group initially registered at a base station control station.
FIG. 4 is a flowchart showing an outline of flow of a frequency assignment operation by the base station control station.

FIG. 3 is a figure showing an example of frequency assignment for each of small groups initially registered at a base station control station. Frequencies f1 to f10 are assigned to a small group A belonging to the large group E, frequencies f11 to f20 are assigned to another small group B belonging to this large group E, and the same rule applies correspondingly to the following. Frequencies f1 to f40 are assigned to small groups F to I in another large group J which are respectively positioned distantly from the small groups A to D in the large group E. For example, pairs of two small groups (A, F), (B, G), (C, H), and (D, I) to which the same frequencies may be assigned are set in advance as pairs of small groups which are positioned so that no interference problem happens even if the same frequencies are assigned to them.

FIG. 4 is a flowchart showing an outline of flow of a frequency assignment operation by the base station control station. The base station control station 13 initializes first a variable "n" for successively specifying large groups to "1" (step S101), and notifies all base stations 11 belonging to the nth large group of their assigned frequencies (step S102). In this embodiment, when "n" is "1", the large group E is specified and the small groups A to D belonging to it are notified of their assigned frequencies. As shown in FIG. 3, the small group A is notified of frequencies f1 to f10, the small group B is notified of frequencies f11 to f20, and the same rule applies correspondingly to the following. After this, the base station control station 13 waits for receiving determined frequencies from all the small groups A to D belonging to the large group E (step S103).

Figure 5:
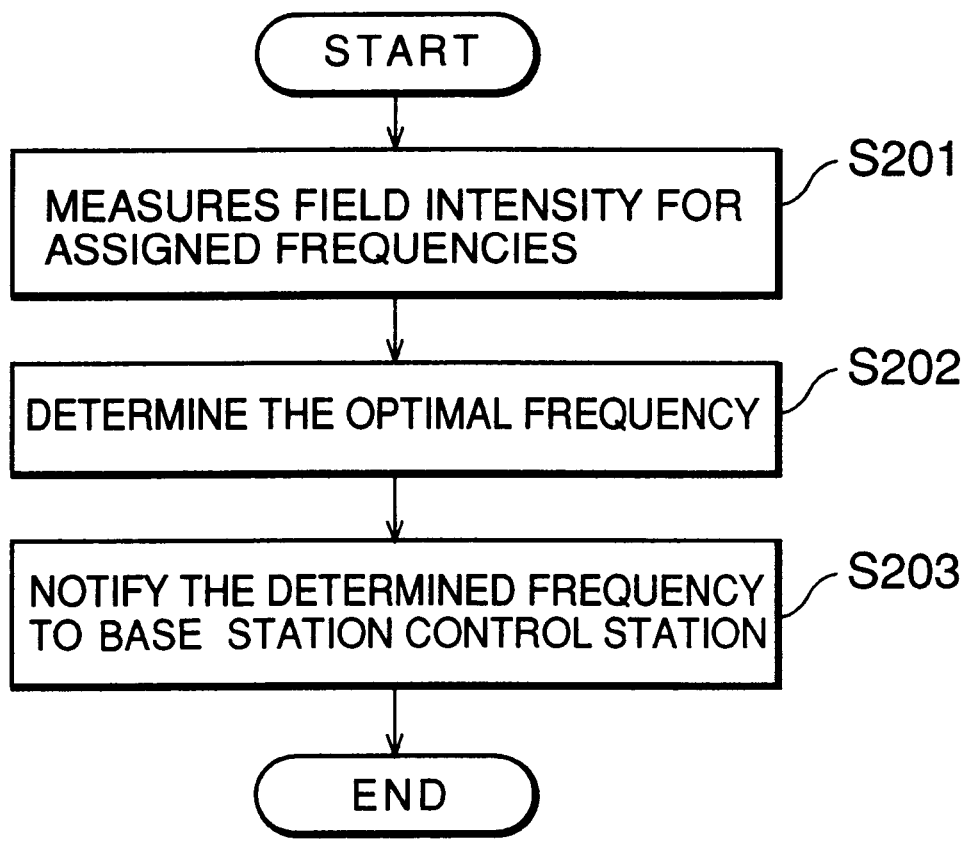
FIG. 5 is a flowchart showing a frequency assignment control of a base station according to a frequency assignment notification by the base station control station.

FIG. 5 is a flowchart showing a frequency assignment control of a base station according to a frequency assignment notification from the base station control station. Each of the base stations 11(1) to 11(N) is also provided faith a CPU (not illustrated) and performs a control for assigning a frequency according to a program stored in an unillustrated storage medium. Namely, each of the base stations 11(1) to 11(N) measures field intensity for each of frequencies notified from the base station control station 13 by means of the frequency measuring unit 23 (step S201). This measurement repeated five times for each frequency. For example, since the first to fourth base stations 11(1) to 11(4) forming the small group A are notified of assignment of frequencies f1 to f10, each of these stations selects one by one these ten frequencies and measures five times field intensity of each of these frequencies radiated from surrounding area.

Figures 6, 7:
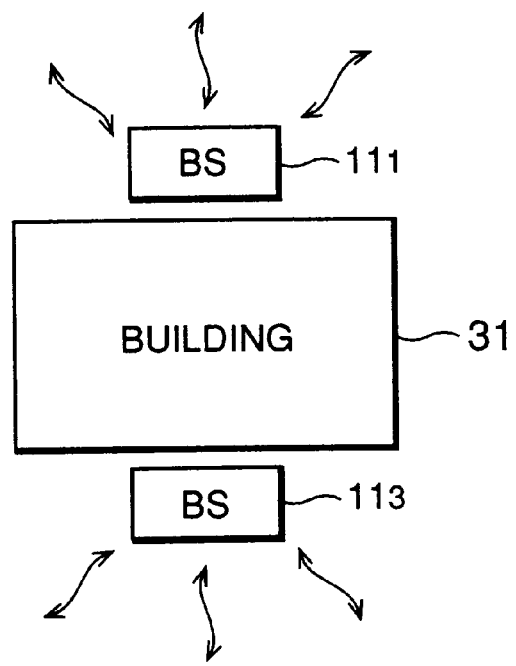
FIG. 6 is an explanatory figure showing relation between frequencies assigned to a base station of a small group A and their field intensity being detected.
FIG. 7 is an explanatory figure showing a positional relation between two base stations as an example in which the two base stations cannot correctly measure their frequencies between them.

FIG. 6 is a figure showing relation between the frequencies assigned to a base station of the small group A and measuring result (a mean value) of field intensity of each frequency radiated from surrounding area. This base station determines a frequency f6 as an operational frequency of this station, because the field intensity of frequency f6 being used by surrounding area is the lowest (step S202). The base station control station 13 is notified of the respective determined operational frequencies from these base stations 11 (step S203). As for the small groups B to D also, similarly, the field intensity of the respective assigned frequencies is measured, and a frequency which is minimum probability of interference is selected as operational frequency of a base station.

Returning to FIG. 4, the description is continued. When the base station control station 13 is notified that their operational frequencies have been determined from all the base stations 11(1) to 11(M) of small groups A to D belonging to the large group E as the first large group (step S103; Y), the base station control station 13 counts the value "n" up by "1" (step S104). And until the value "n" comes to exceed the number "X" of large groups (step S105), the base station control station 13 returns to step S102 and notifies base stations in the next large group of assigned frequencies in the same manner. In this embodiment, when "n" is "2", the small groups F to I belonging to the large group J shown in FIG. 2 are notified of their assigned frequencies. In such a way as this, when operational frequencies of all the base stations 11(1) to 11(N) controlled by the base station control station 13 have been determined, a control operation for assigning frequencies ends.

In the base station frequency assigning system of this embodiment, some specific base stations sometimes cannot correctly measure frequencies of their adjacent base stations to each other. In such a case as this, this embodiment limits a range of frequencies to be selected so that no interference problem can be caused even if these base stations 11 select frequencies without any considerations.

FIG. 7 shows an example of a case in which a frequency cannot be correctly measured between two base stations each other. In this example, there is a building 31 between the first base station 11(1) and the third base station 11(3) in a small group A. Accordingly, the first base station 11(1) and the third base station 11(3) cannot confirm frequencies of their neighboring stations to each other due to blocked by the building 31. Information of a pair of base stations 11 which cannot correctly detect frequencies of their neighboring base stations to each other is stored as data in the prohibiting information instructing unit 25 in the operation and maintenance center 17. Such information of a pair of base stations 11 as this can be properly added or deleted by means of an unillustrated input device such as a keyboard and the like in the operation and maintenance center 17.

In case that the first base station 11(1) and the third base station 11(3) of the small group A cannot confirm frequencies of their neighboring base stations to each other an such a manner as this, the base station control station 13 limits assignment of frequencies so that the base stations 11(1) and 11(3) do not select the same frequency as each other when it assigns the frequencies f1 to f10 to the base stations in the small group A.

Figures 8, 9A, 9B:
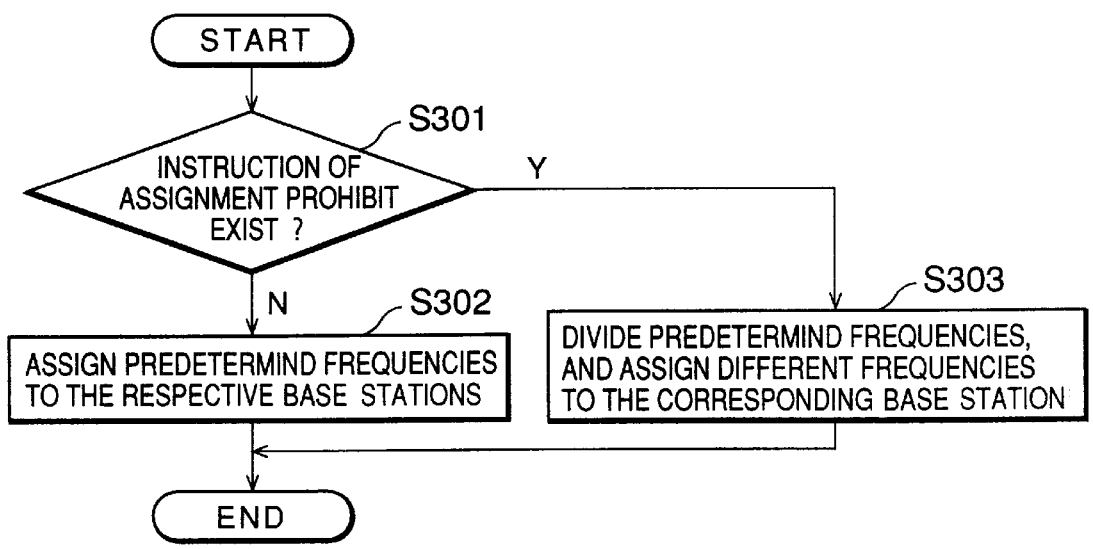
FIG. 8 is a flowchart concretely showing a frequency assignment operation in step S102 in FIG. 4.
FIG. 9(A) is the case for the first base station and FIG. 9(B) is the case for the third base station.

FIG. 8 is a flowchart concretely showing a frequency assignment operation in step S102 in FIG. 4. The base station control station 13 checks whether or not a small group has an assignment prohibiting instruction when it assigns frequencies to each small group (step S301). In case that a small group has no assignment prohibiting instruction (N), frequencies set in advance are assigned to the respective base stations of the small group (step S302). As described above, the base stations 11(2) and 11(4) having no assignment prohibiting instruction in the small group A are notified of the frequencies f1 to f10 as their assigned frequencies.

On the other hand, the base stations 11(1) and 11(3) having an assignment prohibiting instruction (step S301; Y) are prohibited to select some of frequencies to be used so as not to select the same frequency each other by mistake. In the small group A, for example, the first base station 11(1) is permitted to select one of the frequencies f1 to f5 out of the frequencies f1 to f10 and is prohibited to select the other frequencies f6 to f10. Also the third base station 11(3) is permitted to select one of the frequencies f6 to f10 out of the frequencies f1 to f10 and is prohibited to select the other frequencies f1 to f5 (step S303).

FIG. 9(A) shows relation between frequencies assigned to the first base station and measured field intensity, and FIG. 9(B) shows relation between frequencies assigned to the third base station and measured field intensity. According to these relations, the frequency f3 is selected as an operational frequency in the first base station 11(1) and the frequency f6 is selected as an operational frequency in the third base station 11(3).

In the above-mentioned embodiment, the base stations which cannot measure field intensity of frequencies of neighboring base station correctly due to being blocked by a building and the like are prevented from determining the same frequency as their operational frequency not to interfere with each other by assigning sets of different frequencies in advance to them. In an example of modification of embodiment of the invention, the same frequencies as other base stations 11 in the same small group are assigned to these base stations and then adjustment of their operational frequencies is performed.

Figure 10:
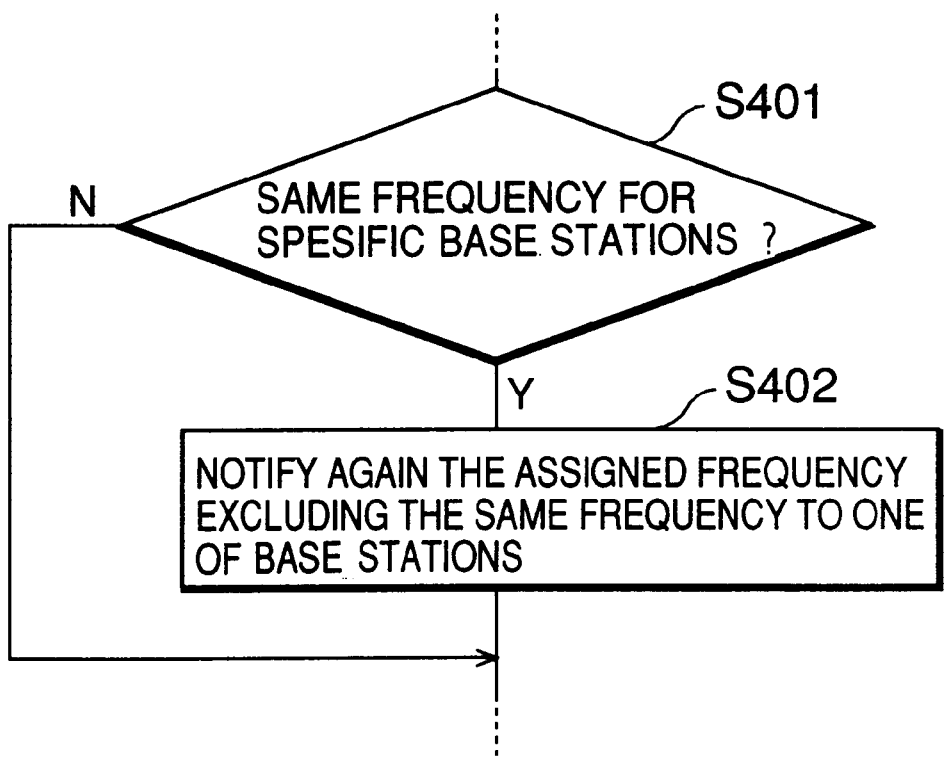
FIG. 10 is a flowchart showing the main part of a control process in a base station control station according to a modification example of the invention.

FIG. 10 is a flowchart showing the main part of a control process in a base station control station according to the modification example of embodiment of the invention. After notifying the respective base stations 11 of their assigned frequencies in step S102 shown in FIG. 4, the base station control station 13 receives the determined operational frequencies from these base stations and checks whether or not the same frequency is assigned to the specific base stations 11(1) and 11(3), which information is stored as data in the prohibiting information instructing unit 25 in the operation and maintenance center 17 shown in FIG. 1 (step S401).

FIG. 11(A) shows relation between frequencies assigned for the first base station and measured field intensity in this modification example, and FIG. 11(B) shows relation between frequencies assigned for the third base station and measured field intensity. In both figures, the field intensity of the frequency f7 is the lowest, and so the same frequency f7 is selected and notified as their operational frequency to the base station control station.

In case that the base stations 11(1) and 11(3) which cannot measure correctly their mutual frequencies have notified the base station control station 13 of the same frequency (Y), the base station control station 13 renotifies one predetermined base station 11 (for example the third base station 11(3)) of the assigned frequencies composed of frequencies except that frequency (step S402).

Figure 12:
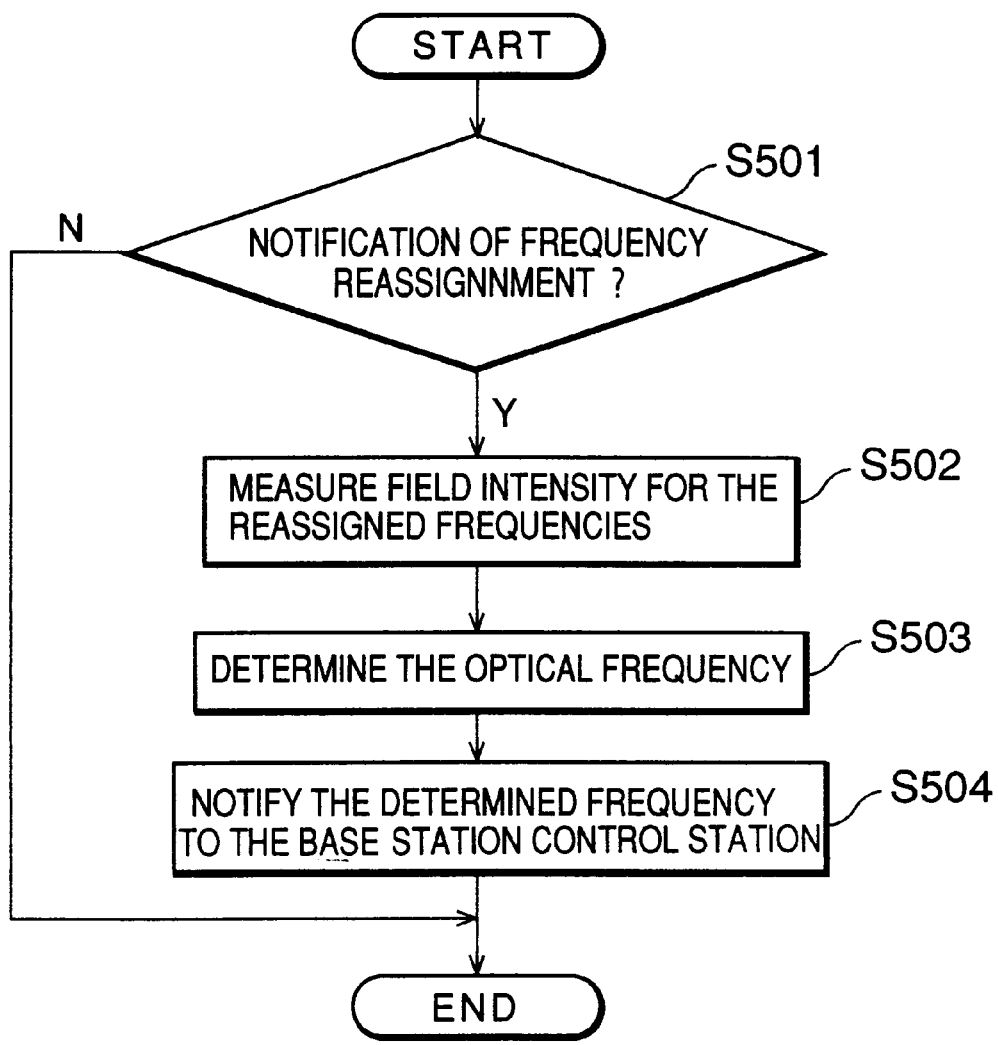
FIG. 12 is a flowchart showing a frequency assignment control of a base station in case that an assigned frequency has been renotified in this modification example.

FIG. 12 is a flowchart showing a frequency assignment control of a base station in case that frequencies to be assigned have been notified again. When such a renotification is performed (step S501; Y), the base station 11 selects one of reassigned frequencies. The frequency measuring unit 23 measures again the field intensity of reassigned frequencies (step 0502). In the above-mentioned example, the third base station 11(3) measures field intensity of the nine frequencies excluding the frequency f7 for five times. The frequency determining unit 24 determines, as its operational frequency, a frequency whose field intensity is the lowest (step S503). And the base station control station 13 is notified of this frequency (step S504).

In the embodiment and its modification, although operational frequencies in the respective base stations are determined according to measurement of field intensity, the optimal frequency may be naturally determined from the result of both measurement of bit-error rate and measurement of field intensity or the result of either one of them.

As described above, according to the present invention, since each base station selects independently its operational frequency, it is possible not only to quickly assign a frequency through assigned frequencies for each group but also to select an optimal frequency in which a condition of each base station being reflected. And also, since pairs of the base stations which are liable to interfere with each other are registered in advance and they are prevented from selecting the same frequency, it is possible to speed up a frequency assignment operation through a simple process.

While the invention has been described in terms of several preferred embodiments, those skilled in the art will recognize that the invention can be practiced with modification within the spirit and scope of the appended claims.

What is claimed is:

1. A base station frequency assigning system for a mobile communication system in which a plurality of base stations are connected to a base station control station, the base station control station is connected to both of an exchange and an operation and maintenance center, and base stations locating adjacent each other are grouped into a small group and small groups locating adjacent each other are grouped into a large group, said base station frequency assigning system comprising:

a frequency assignment prohibiting information instructing means, provided in said operation and maintenance center, for storing information of pairs of base stations in a same small group and having possibility of selecting same operational frequency due to geographical condition, and for instructing this state to said base station control station;

a frequency specifying means, provided in said base station control station, for specifying and notifying a group of frequencies as candidates of an operational frequency to each of base stations one by one in the manner that a different group of frequencies being specified to each of small groups belonging to the same large group and a same group of frequencies specified to small groups belonging to different large groups each other, and for dividing a group of frequencies into two subgroups containing different frequencies each other and notifying different subgroup of frequencies to each of pair of base stations instructed from said operation and maintenance center;

a frequency measuring means, provided in said each of base stations, for measuring field intensity of each of the group of frequencies being notified; and a frequency determining means, provided in said each of base stations, for selecting an optimal frequency not interfering with other base stations out of the subgroup of frequencies being notified.

2. A base station frequency assigning system for a mobile communication system in which a plurality of base stations are connected to a base station control station, the base station control station is connected to both of an exchange and an operation and maintenance center, and base stations locating adjacent each other are grouped into a small group and small groups locating adjacent each other are grouped into a large group, said base station frequency assigning system comprising:

a frequency assignment prohibiting information instructing means, provided in said operation and maintenance center, for storing information of pairs of base stations in a same small group and having possibility of selecting a same operational frequency due to geographical condition, and for instructing this state to said base station control station;

a frequency specifying means, provided in said base station control station, for specifying and notifying a group of frequencies as candidates of an opereational frequency to each of base stations one by one in the manner that a different group of frequencies being specified to each of small groups belonging to the same large group and a same group of frequencies being specified to small groups belonging to different large groups each other;

a frequency measuring means, provided in said each of base stations, for measuring field intensity of each of the group of frequencies being notified;

a frequency determining means, provided in said each of base stations, for selecting an optimal frequency not interfering with other base stations out of the group of frequencies being notified, and for notifying the selected frequency to said base station control station; and wherein, when the selected frequency is notified from said each base station, said frequency specifying means judges whether or not the same frequency has been selected by each of said pair of base stations instructed from said operation and maintenance center, and specifies again a group of frequencies excluding the selected frequency to one of said pair of base stations when the same frequency has been selected by both of said pair of base stations.

3. A base station frequency assigning system for a mobile communication system in which base stations located adjacent to each other are grouped in a small group and small groups located adjacent to each other are grouped into a large group, said base station frequency assigning system comprising:

a frequency assignment prohibiting information unit, which stores predetermined information regarding a group of base stations in a same small group having a capability of selecting a same operational frequency due to geographical location;

a frequency specifying unit, which specifies and notifies a group of frequencies as candidates of an operational frequency to each of base stations in a manner such that a different group of frequencies are specified to each of small groups belonging to a same large group and a same group of frequencies are specified to small groups belonging to different large groups, and divides a group of frequencies into subgroups containing different frequencies with respect to each other and notifies a different subgroup of frequencies to each of a group of base stations stored in the predetermined information in the frequency assignment prohibiting information unit; and each of the base stations comprises a frequency measuring and determining unit, which measures a field intensity of each of frequencies and selects an optimal frequency that does not interfere with other base stations out of the subgroup of frequencies notified by the frequency specifying unit.

4. A base station frequency assigning system for a mobile communication system in which base stations located adjacent to each other are grouped in a small group and small groups located adjacent to each other are grouped into a large group, said base station frequency assigning system comprising:

a frequency assignment prohibiting information unit, which stores predetermined information regarding a group of base stations in a same small group having a capability of selecting a same operational frequency due to geographical location;

a frequency specifying unit, which specifies and notifies a group of frequencies as candidates of an operational frequency to each of base stations in a manner such that a different group of frequencies are specified to each of small groups belonging to a same large group and a same group of frequencies are specified to small groups belonging to different large groups; and each of the base stations comprises a frequency measuring and determining unit, which measures a field intensity of each of frequencies and selects an optimal frequency that does not interfere with other base stations out of a subgroup of frequencies notified by the frequency specifying unit; and wherein, when a same frequency has been selected by a plurality of base stations in said group of base stations stored as the predetermined information in the frequency assignment prohibiting information unit, the frequency assignment prohibiting information unit respecifies a group of frequencies excluding the selected frequency to remaining ones of the base stations excluding one base station in the group of base stations, the one base station having been selected to use the selected frequency.

* * * * *